(12) United States Patent
Azpiroz Villar

(10) Patent No.: US 6,546,858 B1
(45) Date of Patent: Apr. 15, 2003

(54) MARKING MACHINE WITH FIXED MOTORS

(75) Inventor: Francisco Azpiroz Villar, San Sebastian (ES)

(73) Assignee: Proyectos y Fabricacion Electronica S.A. (ES)

( * ) Notice: Subject to any disclaimer, the term of this patent is extended or adjusted under 35 U.S.C. 154(b) by 0 days.

(21) Appl. No.: 09/674,295
(22) PCT Filed: May 26, 1999
(86) PCT No.: PCT/ES99/00155
§ 371 (c)(1), (2), (4) Date: Oct. 26, 2000
(87) PCT Pub. No.: WO99/61259
PCT Pub. Date: Dec. 2, 1999

(30) Foreign Application Priority Data

May 28, 1998 (ES) .............................................. 9801114

(51) Int. Cl.[7] ............................................... B41F 15/00
(52) U.S. Cl. ......................... 101/114; 101/3.1; 33/1 M; 74/471 XY; 83/548
(58) Field of Search ............................... 101/114, 3.1, 4, 101/35; 33/1 M, 18.1; 74/471 XY, 479.01; 83/548, 574, 613, 614, 646

(56) References Cited

U.S. PATENT DOCUMENTS

| 4,624,169 A | * | 11/1986 | Nelson ..................... 33/1 M X |
| 4,713,887 A | * | 12/1987 | Kitamura ..................... 33/1 M |
| 5,207,115 A | * | 5/1993 | Takei ..................... 74/479.01 |
| 6,178,860 B1 | * | 1/2001 | Peters et al. ................... 83/461 |

* cited by examiner

Primary Examiner—Daniel J. Colilla
Assistant Examiner—Minh H. Chau
(74) Attorney, Agent, or Firm—Bierman, Muserlian and Lucas

(57) ABSTRACT

A marking machine with fixed motors comprising a first electric and fixed motor for transmitting motion to a first head sliding on a first guide in the OX direction, a second electric and fixed motor for transmitting motion to a working head sliding on a second guide in the OY direction; wherein a support is integral with the first head and the second guide; the first and second motors being controlled so as to create a differential motion between the two motors sufficient to effect displacement in the OY direction.

2 Claims, 1 Drawing Sheet

MARKING MACHINE WITH FIXED MOTORS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

In the marking devices presently known, it is necessary to move a punch on two axles, X and Y, making the shape of the character or logo to be printed. Through several percussions of the punch, strokes on the part are produced, resulting in a distortion marking.

The punch should be able to move in an X and Y plane. To move the punch two motors are used, one motor moving the punch on the X axle and the other punch on the Y axle.

Due to the construction of the present systems, one of the motor moves with the cursor on one of the axles, i.e., one of the motors is fixed and the other motor is movable, which means that one of the motors must make a higher effort since it must carry the mass of the other motor.

The marking machines with two guides presently known, are provided with a fixed motor which, through a belt or worm screw, transmits the motion to a part sliding on one of the guides in one of the axles, for example axle X;

on that part is the fastening of the Y axle motor, the second guide and on this guide the punch.

BRIEF SUMMARY OF THE INVENTION

In summary, the present invention comprises a marking machine with fixed motors, characterizing in that it is fitted with:

a) for axle OX a first electric and fixed motor, means to transmit its motion to a first head sliding on a first guide;

b) a support integral to the said first head and with a second guide;

c) for axle OY a second electric and fixed motor, means to transmit its motion to a work head sliding on said second guide;

the first and second motor being governed in such a manner that a differential motion is created between them, to carry out the travel on axle OY in the required quantity.

A marking machine with fixed motors, as per above, featuring in that the transmission means are belts and/or spindles.

The purpose of the invention overcomes this problem since, through two motors and two guides, it can move one cursor or punch on an X, Y plane, not requiring the motion of any of the motors to move the head, i.e., none of the motors must move on an axle together with the guide and the punch.

BRIEF DESCRIPTION OF THE SEVERAL VIEWS OF THE DRAWINGS

For a better understanding of the purpose of the present invention, the drawings show a preferred mode of practical execution, susceptible of accessory changes not impairing its basic features.

DETAILED DESCRIPTION OF THE INVENTION

Figure 1:
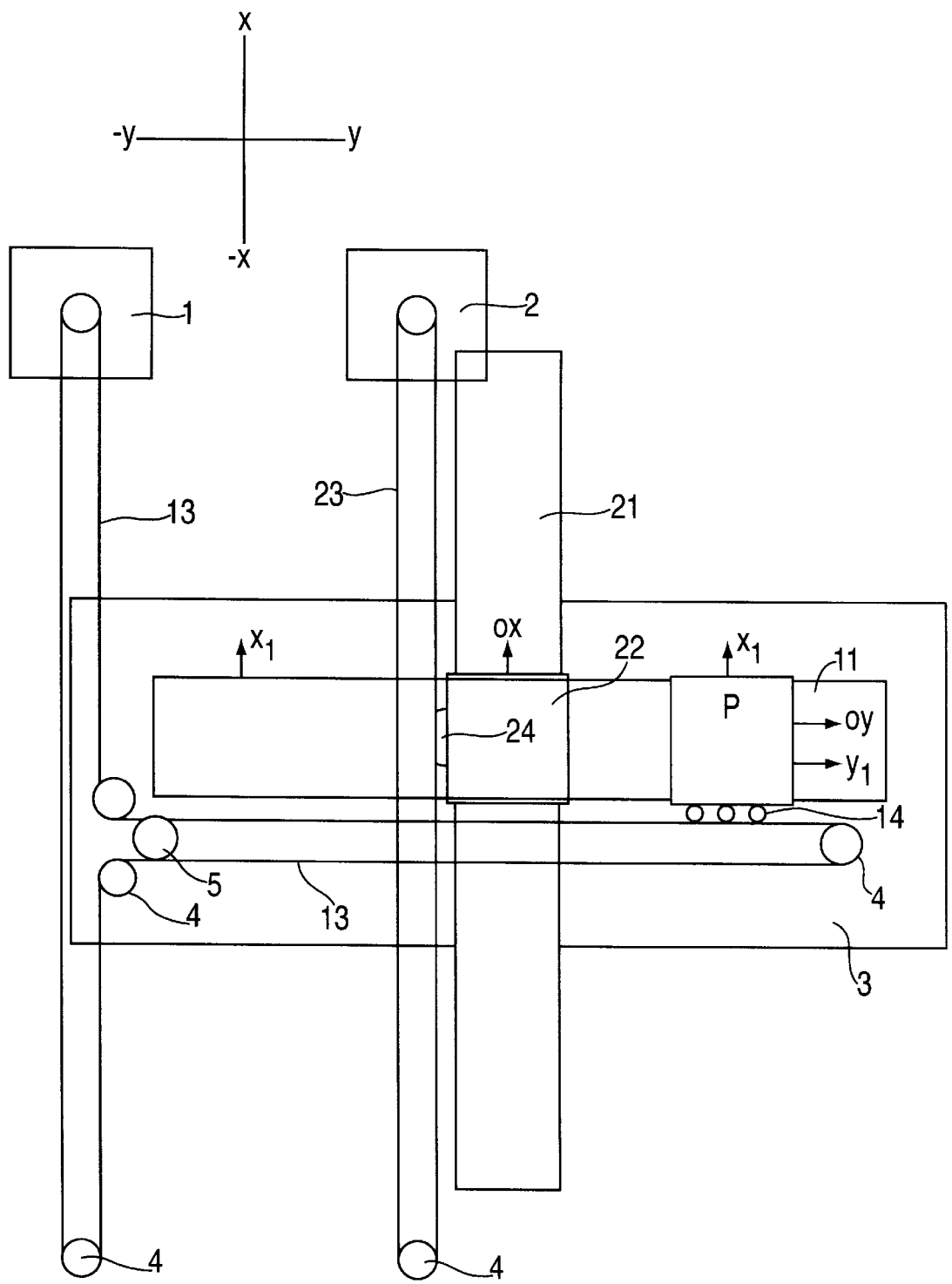
FIG. 1 is a plan view layout of a practical execution of the invention.

A practical, not limiting execution example of the present invention is described below.

In a first level there is a first electric and fixed motor (2), for example a stepper motor, for the required motion as per axle OX.

There is a guide (21) for the OX axle on which a head (22) slides; the head receives the motion of motor (2) through the appropriate transmission means, for instance a belt (23) with an area (24) fixed to the head (22).

In a second level and integral to the head (22) a support (3) is provided.

In a third level a second motor (1) is located fixed; this motor will normally be of the same nature as the first motor (2) and, through a belt (13) transmits its motion to a work head (P). which can slide on a second guide (11) arranged as per axle OY, the work head (P) being the carrier of the cursor/punch.

There is a junction area (14) between the work head (P) and the transmission belt (13).

The second guide (11) is integral to the support (3).

For all motions the relative pulleys (4) are used.

With this arrangement the desired goal is attained, i.e., the travel of the cursor/punch on an XY plane without any involvement of the motors (1), (2) causing said travel in the travel itself, i.e., that the cursor/punch travels, but the motors (1), (2) do not.

The controls or management of the motors (1), (2) are not specified, since they are supposedly conventional.

It is to be noted that the action of the first motor (2) axle OX produces a motion (X1) of the assembly on the OX axle since the head (22), the support (3) and the second guide (11) are integral, they carry with them the work head (P) which, by belt (13), produces a motion (Y1) on the OY axle of said work head (P), independent from the action of the second motor (1), i.e., that the action of the first motor (2) produces motions of the work head (P) on both axles OX, OY and the action of the second motor (1) only produces motions on axle oy.

For the work head (P) to travel only on axle OX, it will be necessary that the second motor (1) produce a motion of the work head (P) on axle OY of the same value and in the opposite direction $(-Y_1)$ to that induced by the first motor (2).

The travel on axle OY will be attained with a differential motion/action between both motors (1), (2) and the relative transmissions.

In the simplest condition and according to the arrangement in FIG. 1, it would happen that, regarding the work head (P), if you want it to move on axle X, both motors (1), (2) operate simultaneously doing the same motion and in the same direction. If you want the work Head (P) to move on the OY axle, the OY motor should have a larger travel than motor (2) OX, so that the difference between both motors will be the travel of the punch on the OY axle, If you want the head to move backward, the travel of axle OY should be smaller than that of OX. Of course, if the travels are larger than the axle motion differences, motor (1) OY should change the rotation direction.

Of course, the calculations of the quantity of travel vary if motors (1), (2) are not similar and the transmissions with direct/inverse gear ratios also vary. For instance, you may think on a travel direction inverter (5), so the first part of the belt (13) would not directly connect with the second part of the belt (13) but through inverter (5).

Obviously, any transmission means can be used, belts of different shapes, spindles, gears, bands, etc.

I claim:

1. A marking machine with two fixed motors comprising a first fixed electric motor for transmitting motion to a first head sliding on a first guide in an OX direction, and to a working head sliding on a second guide in said OX direction and in an OY direction; a second fixed electric motor for transmitting motion to said working head sliding on said second guide in said OY direction; wherein a support is integral with the first head and the second guide; the first and second motors being controlled so as to create a differential motion between the two motors sufficient to effect displacement in the OY direction.

2. The marking machine of claim 1 wherein a transmission means comprises belts and spindles.

* * * * *